United States Patent [19]
Jeong et al.

[11] Patent Number: 6,028,646
[45] Date of Patent: Feb. 22, 2000

[54] COLOR IMAGE ENHANCEMENT DEVICE FOR VIDEO DISPLAY APPLIANCE

[75] Inventors: Jin Kuk Jeong; Woo Jin Song, both of Kyoungsangbuk-do, Rep. of Korea

[73] Assignee: LG Electronics, Inc., Seoul, Rep. of Korea

[21] Appl. No.: 08/822,656

[22] Filed: Mar. 24, 1997

[30] Foreign Application Priority Data

Mar. 25, 1996 [KR] Rep. of Korea .......................... 96-8165

[51] Int. Cl.[7] .................................................. H04N 9/64
[52] U.S. Cl. ............................ 348/645; 348/34; 348/649; 348/708; 348/627; 358/520; 382/254
[58] Field of Search .................................. 348/645, 647, 348/678, 679, 708, 29, 30, 32–34, 630, 631, 649–54, 625, 624, 627; 358/520, 518; 382/167, 254; H04N 9/64

[56] References Cited

U.S. PATENT DOCUMENTS

| | | | |
|---|---|---|---|
| 4,630,107 | 12/1986 | Takanashi et al. | 348/290 |
| 4,768,089 | 8/1988 | Kato | 348/71 |
| 4,805,016 | 2/1989 | Kato | 358/98 |
| 4,812,902 | 3/1989 | Fuchsberger | 358/521 |
| 4,812,903 | 3/1989 | Wagensonner et al. | 358/521 |
| 4,812,905 | 3/1989 | Rossi | 348/630 |
| 4,819,077 | 4/1989 | Kikuchi et al. | 348/71 |
| 4,831,434 | 5/1989 | Fuchsberger | 358/521 |
| 4,951,127 | 8/1990 | Mehrgardt et al. | 348/651 |
| 5,278,678 | 1/1994 | Harrington | 358/518 |
| 5,412,433 | 5/1995 | Holland et al. | 348/650 |
| 5,452,017 | 9/1995 | Hickman | 348/646 |
| 5,489,998 | 2/1996 | Yamada et al. | 358/523 |
| 5,621,479 | 4/1997 | Akiyama | 348/648 |
| 5,739,922 | 4/1998 | Matama | 358/447 |
| 5,793,501 | 8/1998 | Murakami | 358/520 |
| 5,930,009 | 7/1999 | Sato et al. | 358/518 |

OTHER PUBLICATIONS

Derwent, Colour Image Enhancement Device for Video Display Device, Derwent 1997–4515312, Jan. 1997.

Strickland et al., Digital Color Image Enhancement Based on the Saturation Component, 26 Optical Engineering 7, p. 609–16 (Jul. 1987).

*Primary Examiner*—John K. Peng
*Assistant Examiner*—Jean W. Désir
*Attorney, Agent, or Firm*—Oppenheimer Wolff & Donnelly LLP

[57] ABSTRACT

A color image enhancement device for a video display appliance capable of improving the sharpness of the color image using a saturation component. The device includes an RGB (red, green, blue)/saturation conversion section for obtaining a saturation of an image of an RGB color model, a saturation enhancement section for emphasizing a high frequency band of the saturation outputted from the RGB/saturation conversion section to enhance the saturation, and a saturation/RGB conversion section for converting an output of the saturation enhancement section into enhanced color signals.

3 Claims, 13 Drawing Sheets

| (IMAGE CORRELATION COEFFICIENT) | | | |
|---|---|---|---|
| IMAGE | BABOON | GARDEN | CLOSEUP |
| LUM. & SAT. | 0.9047 | 0.8695 | 0.9200 |
| HUE & SAT. | 0.7596 | 0.8343 | 0.7654 |
| HUE & LUM. | 0.7325 | 0.6678 | 0.7549 |

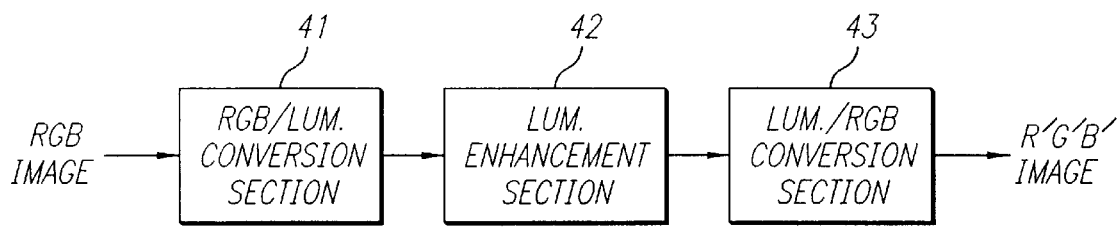
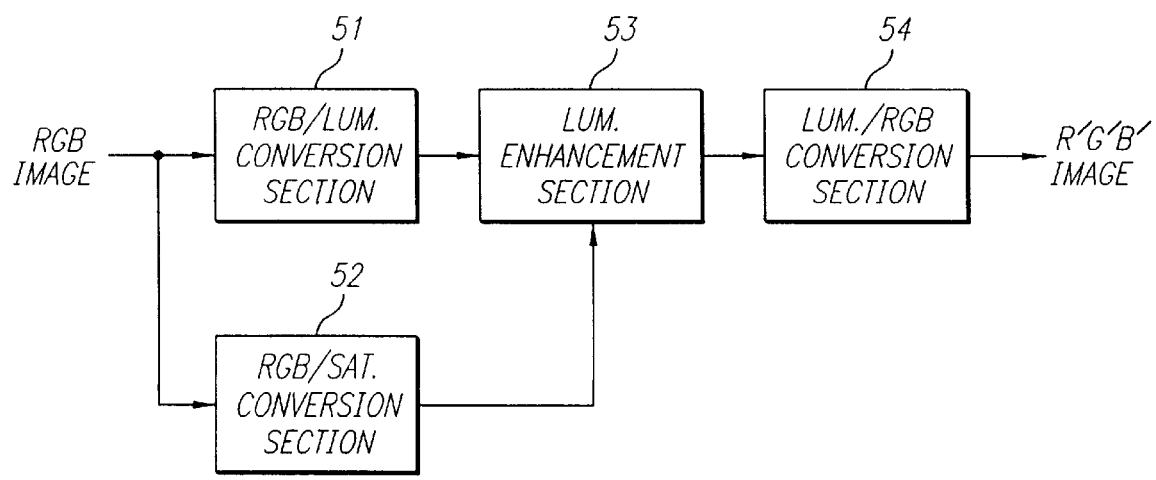

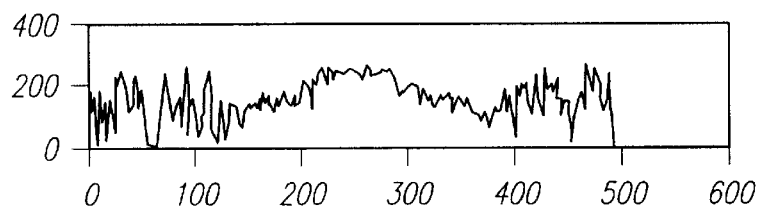
FIG. 17A  R LEVEL
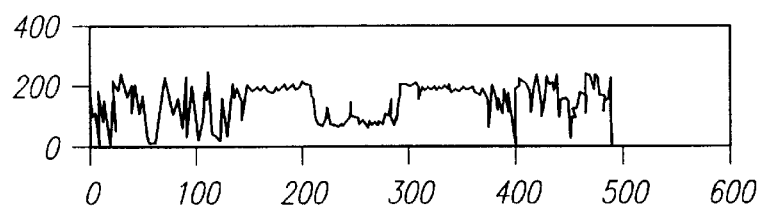
FIG. 17B  G LEVEL
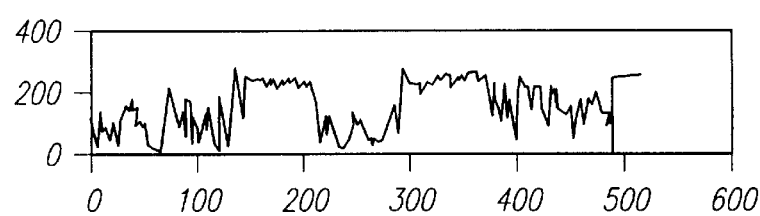
FIG. 17C  B LEVEL
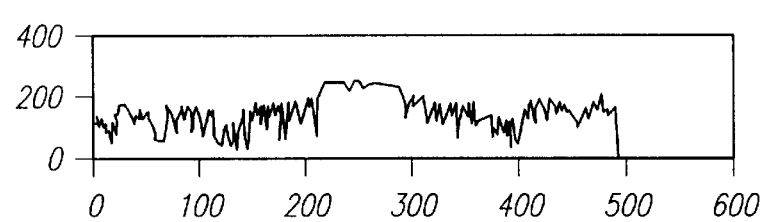
FIG. 17D  R LEVEL
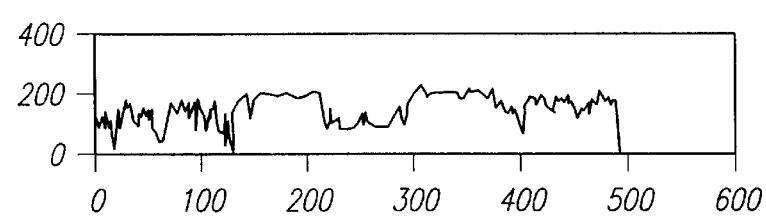
FIG. 17E  G LEVEL
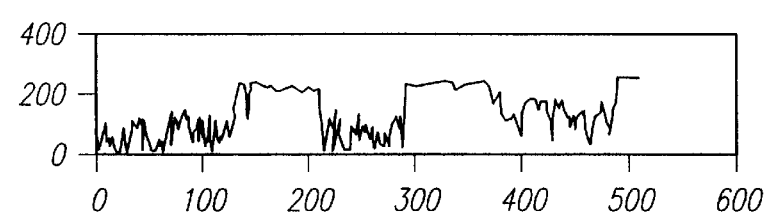
FIG. 17F  B LEVEL

COLOR IMAGE ENHANCEMENT DEVICE FOR VIDEO DISPLAY APPLIANCE

CROSS REFERENCE TO RELATED APPLICATIONS

This application claims priority from Korean Patent Application No. 96-8165, filed on Mar. 25, 1996.

BACKGROUND OF THE INVENTION

1. Field of the Invention

The present invention relates to a color image enhancement technique for a video display appliance. In particular, the present invention relates to a color image enhancement device for a video display appliance which can improve the sharpness of the color image by converting the primary color image of red (R), green (G), blue (B) into a color model of luminance (L), hue (H), saturation (S) and then utilizing the LHS components.

2. Description of the Prior Art

Generally, in order to improve the sharpness of the image displayed on the video display appliance, the luminance component, which is an intrinsic color characteristic of the color image signal of an RGB color model, is used. The luminance component represents the amount of light received by the human eye without considering the color component. However, the luminance component cannot be directly detected from the image of the RGB color model, but can be detected from the image of the LHS (Luminance, Hue, Saturation) color model converted from the RGB color model.

Before describing conventional color image enhancement techniques, the human eye's sensation of the color image in relation to the above described color models will be explained.

The human eye recognizes the color image by the reaction of the brain against the stimulation of light produced on the retina of the eye. The retina has two types of light receptive bodies, i.e., cones and rods. The rods sense a dark light and receive the entire feature of the image, but cannot recognize color. The cones mainly sense a bright light and concrete portions of the image, and has a high sensitivity on color.

As shown in FIG. 1, the cones have the characteristics of three different absorption spectra $S_1(\lambda)$ $S_2(\lambda)$, $S_3(\lambda)$, and the respective responses to the wavelengths of the three spectra have the maximum values in the regions of blue, green, yellow green, respectively.

Assuming that the spectrum energy distribution of a light having a color is $C(\lambda)$, the color sensation, which can be represented by the response to the spectrum, can be illustrated by three receptive body models for color presentation as shown in FIG. 2, and can be expressed by the following equation:

$$\alpha_i(C) = \int_{\lambda_{min}}^{\lambda_{max}} S_i(\lambda)C(\lambda)d\lambda, \quad i=1,2,3 \quad \text{(equation 1.1)}$$

According to the Thomas Young's theory, any colors can be produced by combining three primary colors. Therefore, the color matching using the three primary colors as shown in FIG. 3 can be effected, based on the theory.

Substitution for the spectrum energy distribution of the light having a color as expressed by the equation 1.1 with the color matching utilizing the three primary colors will result in the color matching that can be expressed by the following equation:

$$\alpha_i(C) = \int S_i(\lambda)C(\lambda)d\lambda \quad \text{(equation 1.2)}$$

$$= \int \left[\sum_{k=1}^{3} \beta_k P_k(\lambda)\right] S_i(\lambda) d\lambda$$

$$= \sum_{k=1}^{3} \beta_k \int S_i(\lambda) P_k(\lambda) d\lambda, \quad i=1,2,3$$

where, $P_k(\lambda)$ denotes a spectrum energy distribution of the primary colors, and $\beta_k$ denotes a weighting factor given to the primary colors.

At this time, if it is defined that $a_{i,k} \int S_i(\lambda)P_k(\lambda)d\lambda$, i=1,2,3, and it is substituted for the equation 1.2, the following color matching equation can be obtained.

$$= \sum_{k=1}^{3} \beta_k a_{i,k} = \alpha_i(C) = \int S_i(\lambda)C(\lambda)d\lambda \quad i=1,2,3 \quad \text{(equation 1.3)}$$

In this connection, the tristimulus value for a certain color C can be expressed by the following equation.

$$T_k(C) = \frac{\beta_k}{W_k}, \quad k=1,2,3 \quad \text{(equation 1.4)}$$

Here, $W_k$ represents the amount of the k-th primary color for matching the standard white color. Also, the chromaticity coordinates which represent the relative size of the tristimulus value can be expressed by the following equation:

$$t_k \cong \frac{T_k}{T_1+T_2+T_3}, \quad k=1,2,3 \quad \text{(equation 1.5)}$$

Under the assumption that $t_1+t_2+t_3=1$, and $t_1=x$, $t_2=y$, $t_3=z$, a 2-dimensional color information can be presented by means of the x-y chromaticity coordinates. This is called an x-y chromaticity graph or chromaticity coordinates of International commission on illumination (CIE). However, the CIE chromaticity coordinates have a drawback that the distance between the points representing the same color difference is not uniform. To overcome such a drawback, the tristimulus value may be linearly or non-linearly converted to be represented by a uniform chromaticity scale (UCS).

Now, the color model as described above will be explained in detail. The purpose of color modeling is for an easy processing of the colors utilizing a predetermined standard model. Particularly, in a color model determined by a three-dimensional color coordinates, any colors can be represented by a single point. Most of the color models are hardware-oriented, such as color monitors, printers, etc., or purpose oriented so as to easily process color images such as animations. As hardware models, an RGB color model for color monitors and color video cameras, a color model of cyan (C), magenta (M), yellow (Y) for color printers, and a color model of luminance (Y), inphase (I), quadrature (Q) for color television broadcasting have been used. Also, for an easy processing of the color images, a color model of luminance (Y), hue (H), saturation (S), and a similar color model of hue (H), saturation (S), intensity (I) have been used.

The characteristics of the color models as described above will be briefly explained.

First, the RGB color model can be explained by means of a color cube having three-dimensional axes for presenting the RGB colors, respectively as shown in FIG. 4. Specifically, the respective corner points of the color cube represent eight colors of red, green, blue, cyan, magenta, white, yellow, and black, and colors between black and white are represented by a gray scale.

Second, the CMY color model utilizes secondary colors such as CMY instead of the RGB primary colors. Specifically, the cyan is produced by subtracting a red light from a white light, the magenta is produced by subtracting a green light from the white light, and the yellow is produced by subtracting a blue light from the white light. In dyes, however, the mixture of yellow with magenta produces red, the mixture of yellow with cyan produces green, and the mixture of magenta with cyan produces blue. Because of this property, the CMY color model can be easily applied to the color printers. The matrices between R,G,B and C,M,Y are given by the following equation:

$$\begin{bmatrix} C \\ M \\ Y \end{bmatrix} = \begin{bmatrix} 1 \\ 1 \\ 1 \end{bmatrix} - \begin{bmatrix} R \\ G \\ B \end{bmatrix} \quad \text{(equation 1.6)}$$

Third, the YIQ color model utilizes the characteristics that the human eye is more sensitive to luminance than hue or saturation, and thus a relatively wide bandwidth is assigned to the luminance, while a relatively narrow bandwidth is assigned to the color. The YIQ color model is mainly used for commercial color TV broadcasting. Here, the matrices between YIQ and RGB can be expressed by the following equation:

$$\begin{bmatrix} Y \\ I \\ Q \end{bmatrix} = \begin{bmatrix} 0.299 & 0.587 & 0.114 \\ 0.596 & -0.275 & -0.321 \\ 0.212 & -0.523 & 0.311 \end{bmatrix} \begin{bmatrix} R \\ G \\ B \end{bmatrix} \quad \text{(equation 1.7)}$$

Fourth, the LHS color model poses two significant and useful characteristics. In this color model, the luminance component is separated from the color component and the hue and saturation components play an important role in the human eye's color sensation. Such characteristics will provide ideal tools to the image signal processing algorithm which is based on the human eye's color sensation.

Here, the RGB color model should be converted into the LHS color model to improve the sharpness of the color image. The luminance (L) can be defined by the following equation in the LHS color model:

$$L = 0.3R + 0.59G + 0.11B \quad \text{(equation 1.8)}$$

At this time, the primary RGB colors can be normalized to r,g,b colors by the following equation:

$$r = \frac{R}{R+G+B}, \quad g = \frac{G}{R+G+B}, \quad b = \frac{B}{R+G+B} \quad \text{(equation 1.9)}$$

As shown in FIG. 5A, in order to define the hue and the saturation, it is assumed that a certain color point A is placed on an R,G,B color cube, and a point P penetrates a color triangle configured by three corner points $P_r$, $P_g$, $P_b$ of the color cube. The hue and the saturation can be explained by the color triangle configured by the points $P_r$, $P_g$, $P_b$ as shown in FIG. 5B. The hue represents the color of the spectrum, and the saturation represent the purity of the spectrum. In FIG. 5B, the hue is represented by an angle φ which ranges from 0 to 2π. The saturation is determined using a straight line which connects the point P and the center W of the triangle and reaches a point P' on a side of the triangle. Specifically, the saturation with respect to the color point A is obtained by dividing a straight line WP by a straight line WP'.

Referring to FIGS. 6A and 6B, assuming that a vector (P–W) is defined by a straight line from the center point W of the triangle to the point P penetrating the triangle in order to obtain the hue of the color point A, the dot product of the vector (P–W) and a vector ($P_r$–W) from the normalized point $P_r$ to the triangle center W can be obtained by the following equation:

$$(P-W)\cdot(P_r-W) = |P-W||P_r-W|\cos H \quad \text{(equation 1.10)}$$

Here, since the coordinates of $P_r$, W, P are (1,0,0), (⅓,⅓,⅓), (r,g,b), respectively, the distances |P–W|, |$P_r$–W| between the vectors can be obtained by the following equation:

$$|P-W| = [(r-\tfrac{1}{3})^2 + (g-\tfrac{1}{3})^2 + (b-\tfrac{1}{3})^2] \, |P_r-W| = (\tfrac{2}{3})^{1/2} \quad \text{(equation 1.11)}$$

Since the dot product of the vectors a and b becomes $a\cdot b = a_1 b_1 + a_2 b_2 + a_3 b_3$, the dot product $(P-W)\cdot(P_r-W)$ can be obtained by the following equation:

$$(P-W)\cdot(P_r-W) = \frac{2}{3}\left(r-\frac{1}{3}\right) - \frac{1}{3}\left(g-\frac{1}{3}\right) - \frac{1}{3}\left(b-\frac{1}{3}\right)$$

$$= \frac{1}{3}(2r - g - b) \quad \text{(equation 1.12)}$$

Accordingly, the hue H can be obtain from the equations 1.10, 1.11, 1.12 as follows:

$$H = \cos^{-1}\left[\frac{(P-W)\cdot(P_r-W)}{|P-W|\cdot|P_r-W|}\right] \quad \text{(equation 1.13)}$$

$$H = \cos^{-1}\left[\frac{\frac{1}{3}(2r-g-b)}{\left[\left(r-\frac{1}{3}\right)^2 - \left(g-\frac{1}{3}\right)^2 - \left(b-\frac{1}{3}\right)^2\right]^{1/2} - \left(\frac{1}{3}\right)^{1/2}}\right]$$

$$= \cos^{-1}\left[\frac{2r-g-b}{\sqrt{6\left(\left(r-\frac{1}{3}\right)^2 + \left(g-\frac{1}{3}\right)^2 + \left(b-\frac{1}{3}\right)^2\right)}}\right]$$

However, as shown in FIG. 5B, since the hue H should be considered as three parts of RG sector (0°<H≦120°), GB sector (120°<H≦240°), and BR sector (240°<H≦360°), the equation 1.13 can be generalized as follows:

$$H = \varphi \quad (0 \leq \varphi \leq 2\pi) \quad \text{(equation 1.14)}$$

$$H = \theta + \cos^{-1}\left[\frac{2r-g-b}{\sqrt{6\left(\left(r-\frac{1}{3}\right)^2 + \left(g-\frac{1}{3}\right)^2 + \left(b-\frac{1}{3}\right)^2\right)}}\right]$$

$$\begin{bmatrix} RG\,sector: & N = 2r-g-b, & \theta = 0° \\ GB\,sector: & N = 2r-b-r, & \theta = 120° \\ BR\,sector: & N = 2b-r-g, & \theta = 240° \end{bmatrix}$$

Accordingly, the saturation S as shown in FIG. 7 is obtained by the following equations:

$$S = \frac{|WP|}{|WP'|} \quad \text{(equation 1.15)}$$

$$\frac{|WP|}{|WP'|} = \frac{|WQ|}{|WT|} = \frac{|WT|-|QT|}{|WT|} = 1-3b \quad \text{(equation 1.16)}$$

Here, since $|WT|$ is $\frac{1}{3}$, and $|QT|$ on the RG sector is b, the saturation S becomes 1−3b in accordance with the equation 1.16. The generalized saturation S can be obtained by the following equation:

$$S = 1 - 3\min(r, g, b) \quad \text{(equation 1.17)}$$

If the hue H and the saturation S have been obtained as described above, the conversion process of the LHS color model to the RGB color model will be explained with reference to FIG. 8.

On the RG sector ($0° < H \leq 120°$), b can be obtained by the equation 1.16:

$$b = \tfrac{1}{3}(1 - S) \quad \text{(equation 1.18)}$$

Also, r can be obtained with reference to FIG. 8. As a result, the following equation can be introduced:

$$\frac{|P_r Q_r|}{|P_r O|} = \frac{a}{d} = \frac{|P_r Q_r| - (|WP|\cos H + |WQ_r|)}{1 - r} \quad \text{(equation 1.19)}$$

From the equation 1.19, r is obtained:

$$r = \frac{|WQ_r|}{|P_r O|} + \frac{|WP|}{|P_r Q_r|}\cos H \quad \text{(equation 1.20)}$$

Since $|P_r Q_r|$ is three times $|WQ_r|$, r is given by $$r = \frac{1}{3} + \frac{|WP|}{|P_r Q_r|}\cos H \quad \text{(equation 1.21)}$$

Substituting $|WQ_b| = |WP'|\cos(60°-H) = |WQ_r|$ and the equation 1.15 into the equation 1.21, r is given by:

$$r = \frac{1}{3} + \frac{S|WQ_r|\cos H}{|P_r Q_r|\cos(60° - H)} \quad \text{(equation 1.22)}$$
$$= \frac{1}{3}\left[1 + \frac{S\cos H}{\cos(60° - H)}\right]$$

Since b, r are obtained by the equations 1.18 and 1.22, g can be obtained in accordance with the equation 1.9 as follows:

$$g = 1 - (r + b) \quad \text{(equation 1.23)}$$

On the GB sector ($120° < H \leq 240°$), r,g,b can also be obtained in the same manner as described above, considering the changed angle of hue:

$$r = \tfrac{1}{3}(1 - S) \quad \text{(equation 1.24)}$$

$$g = \frac{1}{3}\left[1 + \frac{S\cos H}{\cos(60° - H)}\right], \quad (H = H - 120°) \quad \text{(equation 1.25)}$$

$$b = 1 - (r + g) \quad \text{(equation 1.26)}$$

On the BR sector ($240° < H \leq 360°$), r,g,b can also be obtained in the same manner as above:

$$g = \tfrac{1}{3}(1 - S) \quad \text{(equation 1.27)}$$

$$b = \frac{1}{3}\left[1 + \frac{S\cos H}{\cos(60° - H)}\right], \quad (H = H - 120°) \quad \text{(equation 1.28)}$$

$$r = 1 - (r + g) \quad \text{(equation 1.29)}$$

By the method as described above, the image of the RGB color model is converted into that of the LHS color model. The luminance image is obtained in accordance with the equation 1.8, and the saturation image is obtained with reference to the equation 1.17.

$$S'(x,y) = 255[1 - S(x,y)] \quad \text{(equation 2.1)}$$

Using the equation 2.1, a range of a negative image is provided because especially in a bright area, the negative image is easily matched by heightening the luminance image and the correlation. The hue is obtained by the equation 1.14. An original image of a baboon having an image size of 512×512, and gray images of luminance, hue, saturation, respectively, (not shown) were made in accordance with the equations 1.8, 1.17, 2.1, 1.14. The original image was composed of 24 bits (R: 8 bits, G: 8 bits, B: 8 bits) per pixel, and the gray image was composed of 8 bits per pixel.

Comparing the images with one another, it was observed that the saturation image had a higher frequency component than the luminance image or the hue image in a bright area. FIGS. 9A to 9C illustrate gray values of 340-th lines of the gray images of luminance and saturation, respectively. It can be confirmed that the saturation waveform has a higher frequency component than the luminance waveform by the comparison of power spectrums utilizing a periodogram described hereinafter.

The hue having an angle range of 0 to 2 π is represented by gray levels ranged from 0 to 255. The waveform of the hue in FIG. 9C shows a high frequency which is almost equivalent to an impulse. This is a result of employing R as a standard hue in representing the hue angle from 0 to 2 π. If the hue of an image has a value close to red, it is represented by a gray level fully ranged from 0 to 255. This results in a high frequency almost equivalent to an impulse given to the pixels having similar hues of red. This property of the hue operates as an adverse element in processing the hue. Since the hue is an intrinsic property of colors, it is desirable to retain the original hue without processing.

Here, the correlation between the luminance, hue and saturation will now be explained. The cross-correlation between the luminance, saturation, and hue in each line of the baboon as shown in FIGS. 9A to 9C can be expressed by the following equation.

$$\phi_{xy} = E[x(n) \cdot y(n+m)] \quad \text{(equation 2.2)}$$

FIG. 10 illustrates the closest correlation between the luminance and saturation, while illustrating the second closest correlation between the hue and saturation. The correlation between the hue and luminance is shown to be the lowest. FIG. 12 illustrates the respective image-correlation coefficients between the luminance and saturation, hue and saturation, and hue and luminance.

However, such data do not provide a sufficient ground to determine the order of the correlation between those three image components. It is therefore more reasonable to study the two-dimensional correlation between the luminance, saturation and hue gray images. The following equation expresses the aforementioned cross-correlation based on the images (not shown) of the baboon.

$$\rho_{AB} = \frac{E[(A-B)(A-B)]}{\rho_A \rho_B} \quad \text{(equation 2.3)}$$

$$= \frac{\sum_x \sum_y A(x,y)B(x,y)}{\sqrt{\sum_x \sum_y A^2(x,y) \sum_x \sum_y B^2(x,y)}} \quad \text{(equation 2.4)}$$

The resultant diagram is illustrated in FIG. 11.

In the equation 2.3, the coefficient ρ represents an interdependency which is defined as $-1 \leq \rho \leq 1$ for clear recognition. If the coefficient ρ has a value of 0, the three image components are in an uncorrelated state. FIG. 11 shows that the images of baboon, Garden and Closeup commonly display the closest correlation between the luminance and saturation, while displaying a relatively low correlation between the hue and luminance. This means that the correlation between the luminance and hue does not greatly affect the human eyes' perception of an image and its enhancement. Accordingly, an attempt to enhance a color image by varying the hue evidently has a limit.

A power spectrum analysis by means of a periodogram will now be explained. Power spectra of the luminance, hue and saturation can be compared by means of a periodogram. The periodogram, which is a method of predicting the power spectrum by receiving a definite number of input sampling data, can be expressed by the following equation.

$$V(e^{jw}) = \sum_{n=0}^{L-1} w[n] \times [n] e^{-jwn} \quad \text{(equation 2.5)}$$

$$w[n] = 0.54 - 0.46 \cos\left(\frac{2\pi n}{M}\right) \quad (0 \leq n \leq M) \quad \text{(equation 2.6)}$$

$$I(w) = \frac{1}{LU} |V(e^{jwn})|^2 \quad \text{(equation 2.7)}$$

The equation 2.6 is a so-called Hamming Window, and I(w) in the equation 2.7 represents a power spectrum. U is a normalizing coefficient.

FIG. 12 demonstrates a power spectrum with input values of the luminance and saturation as shown in FIGS. 9A and 9B by means of the equations 2.5, 2.6 and 2.7. Referring to FIG. 12, the saturation has a higher frequency component than the luminance in the high frequency band. In other words, the saturation element has a high frequency component which is not possessed by the luminance element. This means that the saturation element may play a significant role in enhancing a color image.

However, the conventional method presented to enhance a color image utilizes only the luminance component when converting the RGB color model into the LHS color model. As illustrated in FIG. 13, the equation 1.8 is used to perform the RGB/luminance conversion in the RGB/luminance conversion section 41. Enhancement of the luminance can be obtained by using the high-frequency-emphasis filter with a convolution mask in the luminance enhancement section 42 as follows.

$$L_{hef}(x, y) = L(x, y) * hef \quad \text{(equation 2.8)}$$

$$hef = \begin{bmatrix} -\alpha & -\alpha & -\alpha \\ -\alpha & 1+8\alpha & -\alpha \\ -\alpha & -\alpha & -\alpha \end{bmatrix} \quad \text{(equation 2.9)}$$

An enhanced component of the luminance can be expressed by the following equation 2.10 in the luminance/RGB conversion section 54.

$$K(x, y) = \frac{L_{hef}(x, y)}{L(x, y)} \quad \text{(equation 2.10)}$$

Based on the resultant equation 2.10, the enhanced components of the original R(x,y), G(x,y) and B(x,y) can be expressed by the following equation 2.11.

$$R'(x,y)=K(x,y)R(x,y)$$

$$G'(x,y)=K(x,y)G(x,y)$$

$$B'(x,y)=K(x,y)B(x,y) \quad \text{(equation 2.11)}$$

An original image of baboon was processed with α value of the mask of the high-frequency-emphasis filter in the equation 2.9 set to "0.1" for enhancement of the luminance. The resulting image (not shown) demonstrated an enhanced color image which is attributable to an enhancement of the luminance. Since there can be either an increase or decrease of the RGB values, however, the general hue of the image in the resulting image appeared to have decreased in comparison with the baboon image. The color image is enhanced as the α value of the high-frequency-emphasis filter increases. However, white or black outline becomes excessively thick around the boundary of images or lines because of the saturation of the varied amount of R,G,B, thereby damaging intrinsic colors of adjacent images. It is a result of separate processing of the luminance from the hue and saturation which are intrinsic properties of colors.

Another method of enhancing color images by means of S (Strickland), K (Kim) and M (McDonell) is presented in FIG. 14. This method converts the RGB color model into the LHS color model, and utilizes the saturation element and luminance element as described below.

Referring to the equation used in the color enhancement system according to S.K.M. shown in FIG. 14, the luminance element L is obtained through conversion of the RGB/luminance performed in the RGB/luminance conversion section 51 by means of the equation 1.8. The saturation element S is obtained at the RGB/saturation conversion section 52 by means of the equations 1.9 and 1.17. The negative image S' of the saturation is obtained by means of the equation 2.1. The luminance enhancement section 53 receives the respective output images from the RGB/luminance conversion section 51 and RGB/saturation conversion section 52 to obtain L' (x,y) by means of the following equations.

$$L'(x,y)=L(x,y)+k_1[L(x,y)-L(x,y)]+k_2[S'(x,y)-S(x,y)] \quad \text{(equation 2.12)}$$

$$L'(x,y)=L(x,y)+k_3[\max\{L(x,y)-L(x,y):S'(x,y)-S(x,y)\}] \quad \text{(equation 2.13)}$$

Here, the equation 2.12 is entitled as Version 1, while the equation 2.13 is entitled as Version 2. L(x,y) represents an average region of the 3×3 pixel window of the luminance, while S(x,y) represents an average region of the 3×3 pixel window of the negative image of the saturation in the equations 2.12 and 2.13. The equation 2.12 is an expression of obtaining an enhanced luminance L'(x,y) by adding a weighting value of $k_1$ to the high-frequency-filtered value of the luminance and a weighting value of $k_2$ to the high-frequency-filtered value of the negative image of the saturation, which are to be added to the original luminance component L(x,y). The equation 2.13 is an expression of obtaining an enhanced luminance L'(x,y) by adding a weighting value of $k_3$ to the greater value between the high-frequency-filtered value of the luminance and the high-frequency-filtered value of the negative image of the saturation, which is to be added to the original luminance component L(x,y). An enhanced luminance component k(x, y) can be obtained at the luminance/RGB conversion section 54 by means of the equation 2.10. An enhanced R'G'B' color image can further be obtained by means of the equation 2.11.

Images resulting from simulation experiments according to S.K.M. were produced from an original baboon image, while FIG. 16C shows a resultant image when using weighting values of $k_1=1$ and $k_2=2$ in the Version 1 of the equation 2.12. The resulting image showed shows a greatly enhanced color image in comparison with the original baboon image.

However, this S,K,M method is nothing more than an incorporation of the high frequency component of the saturation into the luminance component in utilizing the saturation without utilizing an intrinsic nature of the color. This method has been proven in the experiments as having a drawback of producing a color image lacking of the hue element despite an enhancement of the entire image. The $k_1=1$ and $k_2=2$ image referred to above, and an image which was a result of processing the luminance element only, manifested an obvious defect of the hue around the monkey's eyes.

As described above, the conventional method of enhancing a color image utilizing the luminance serves to enhance the image to a certain extent. However, it carries a drawback of lacking the hue in general in comparison with the baboon image. It also poses a problem of diminishing the hue while enhancing the image in proportion to the α value. Also, the method of enhancing a color image by means of S.K.M. does not utilizes the intrinsic nature of the color but merely incorporates the high frequency component of the saturation into the luminance, thereby carrying a drawback of lacking a hue component because the S,K,M method ignores the intrinsic property of the color despite an enhancement of the color image.

SUMMARY OF THE INVENTION

It is an object of the present invention to solve the problems involved in the prior art, and to provide a color image enhancement device for a video display appliance which can improve the sharpness of the color image by initially converting the original image into an LHS (luminance, hue, saturation) model image and then utilizing the saturation component of the LHS model which is one of intrinsic color characteristics.

It is another object of the present invention to provide a color image enhancement device for a video display appliance which can improve the purity of the color image as well as the sharpness thereof by processing the luminance component of the image whose saturation component has already been processed.

In order to achieve the above objects, the present invention in one embodiment provides a color image enhancement device comprising an RGB/saturation conversion section, a saturation enhancement section, and a saturation/RGB conversion section.

The RGB/saturation conversion section normalizes an image of RGB primary color components, obtains a saturation therefrom, and produces a negative image of the saturation. The saturation enhancement section filters the negative image of the saturation provided from the RGB/saturation conversion section with its high frequency emphasized so as to enhance the saturation. The saturation/RGB conversion section multiplies the sum of the original RGB color components by the output of the saturation enhancement section, and outputs the multiplied primary color component along with other primary color components.

BRIEF DESCRIPTION OF THE DRAWINGS

The above object, other features, and advantages of the present invention will become more apparent by describing the preferred embodiments thereof with reference to the accompanying drawings, in which:

FIG. 13 is a block diagram of a conventional color image enhancement device using the luminance component.

FIG. 14 is a block diagram of a conventional S,K,M color image enhancement device.

FIGS. 17A and 17F are waveform diagrams illustrating RGB values of a baboon which are luminance-processed and saturation-processed, respectively.

DETAILED DESCRIPTION OF THE PREFERRED EMBODIMENT

Figure 1:
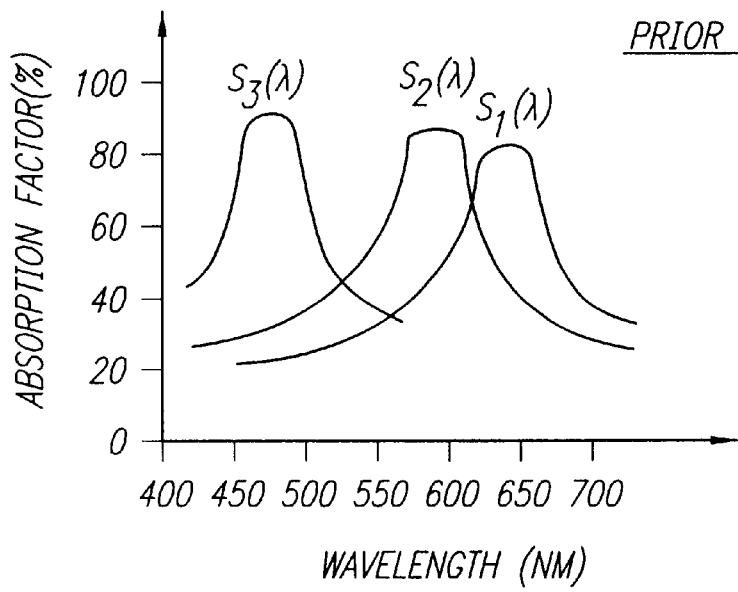
FIG. 1 is a graph illustrating absorption spectra of a conventional cones.
Figure 2:
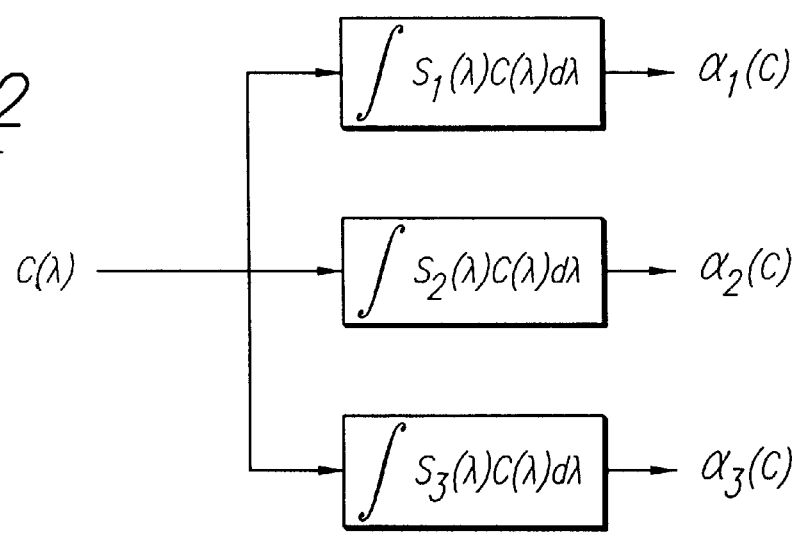
FIG. 2 is a view showing a conventional receptive body model for color representation.
Figure 3:
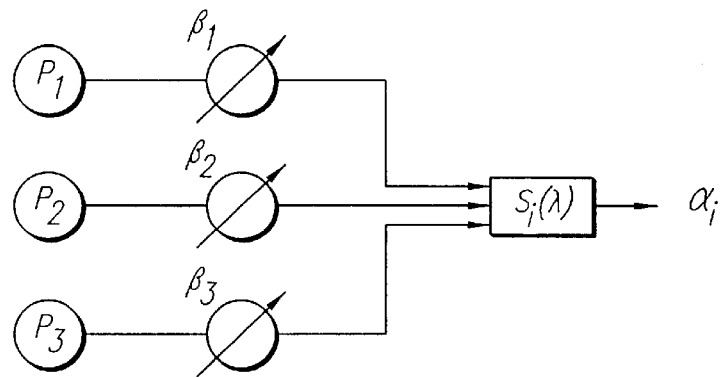
FIG. 3 is a view showing a conventional color matching using the three primary colors.
Figure 4:
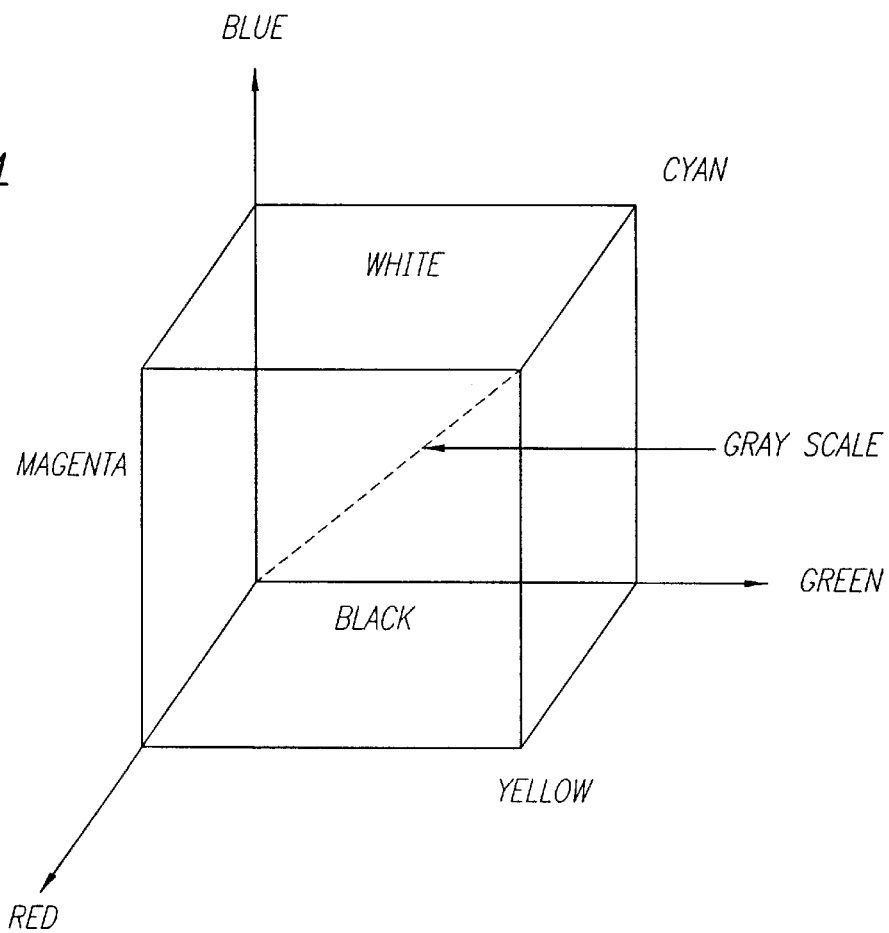
FIG. 4 is a view showing a conventional color cube for RGB color representation.
Figure 5A:
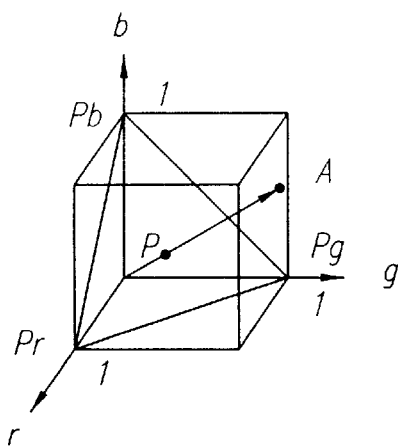
FIG. 5A is a view of a conventional RGB color cube on which a certain color point is placed.
Figure 5B:
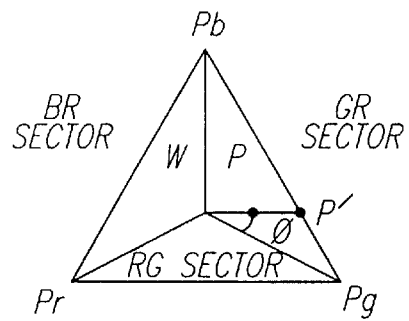
FIG. 5B is a view of a conventional RGB color triangle on which a certain color point is placed.
Figure 6A:
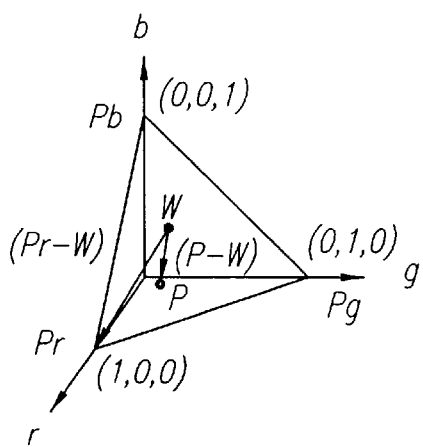
FIG. 6A is a view of two vectors in the color triangle explaining a conventional hue component obtaining method.
Figure 6B:
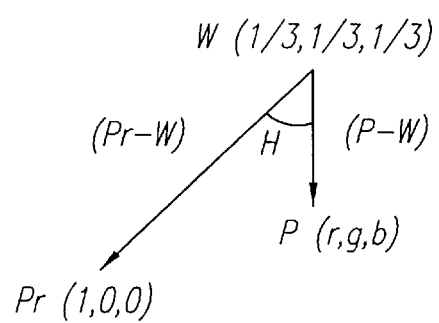
FIG. 6B is a view explaining the dot product of the vectors in accordance with a conventional hue component obtaining method.
Figure 7:
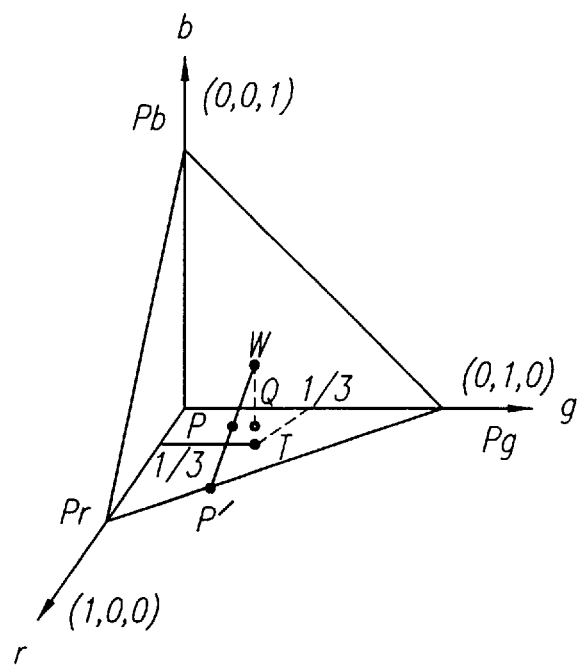
FIG. 7 is a view of a color triangle explaining a conventional saturation.
Figure 8A:
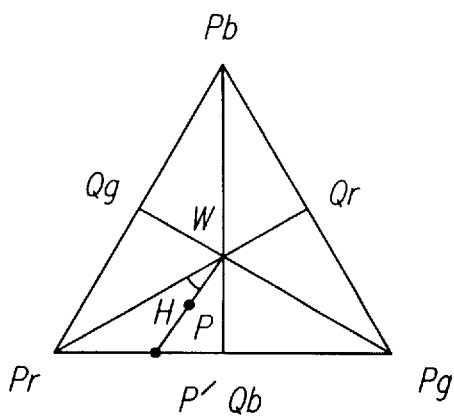
FIGS. 8A and 8B are views explaining a conventional LHS/RGB conversion method.
Figure 8B:
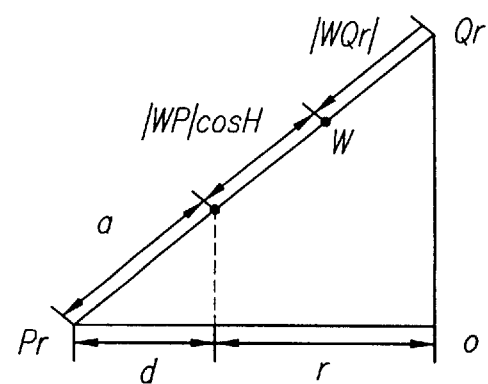
Figure 9A:
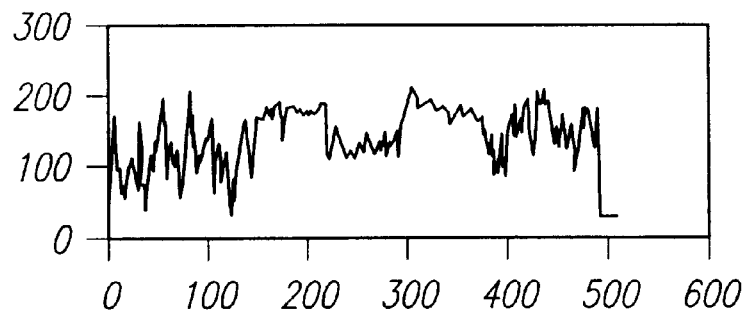
FIGS. 9A to 9C are waveform diagrams of the luminance, saturation, and hue of a baboon displayed according to a conventional device.
Figure 9B:
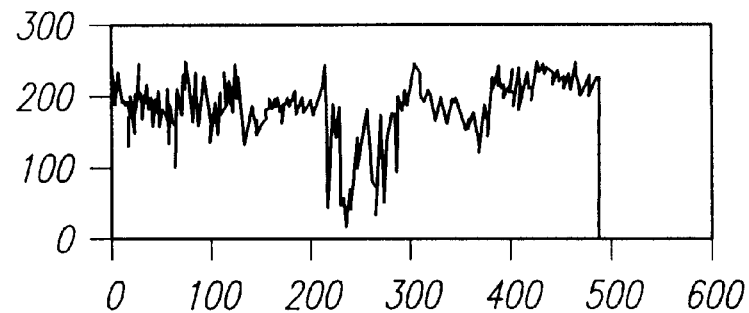
Figure 9C:
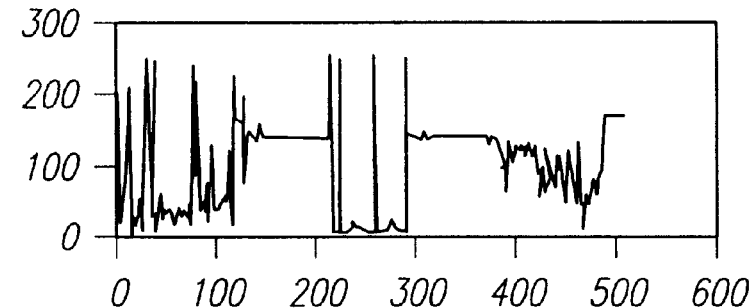
Figures 10, 11:
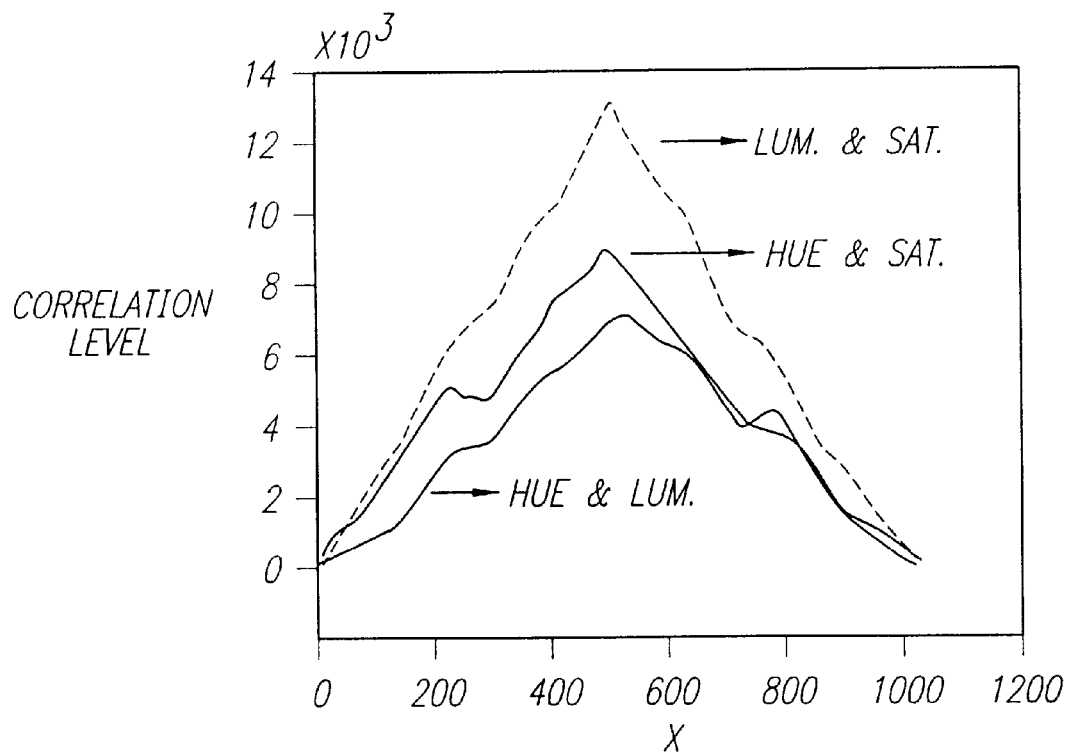
FIG. 10 is a waveform diagram explaining the cross-correlation of the luminance, hue, and saturation for one line according to a conventional device.
FIG. 11 is a table showing the image correlation coefficients of the luminance, hue, and saturation components according to a conventional device.
Figure 12:
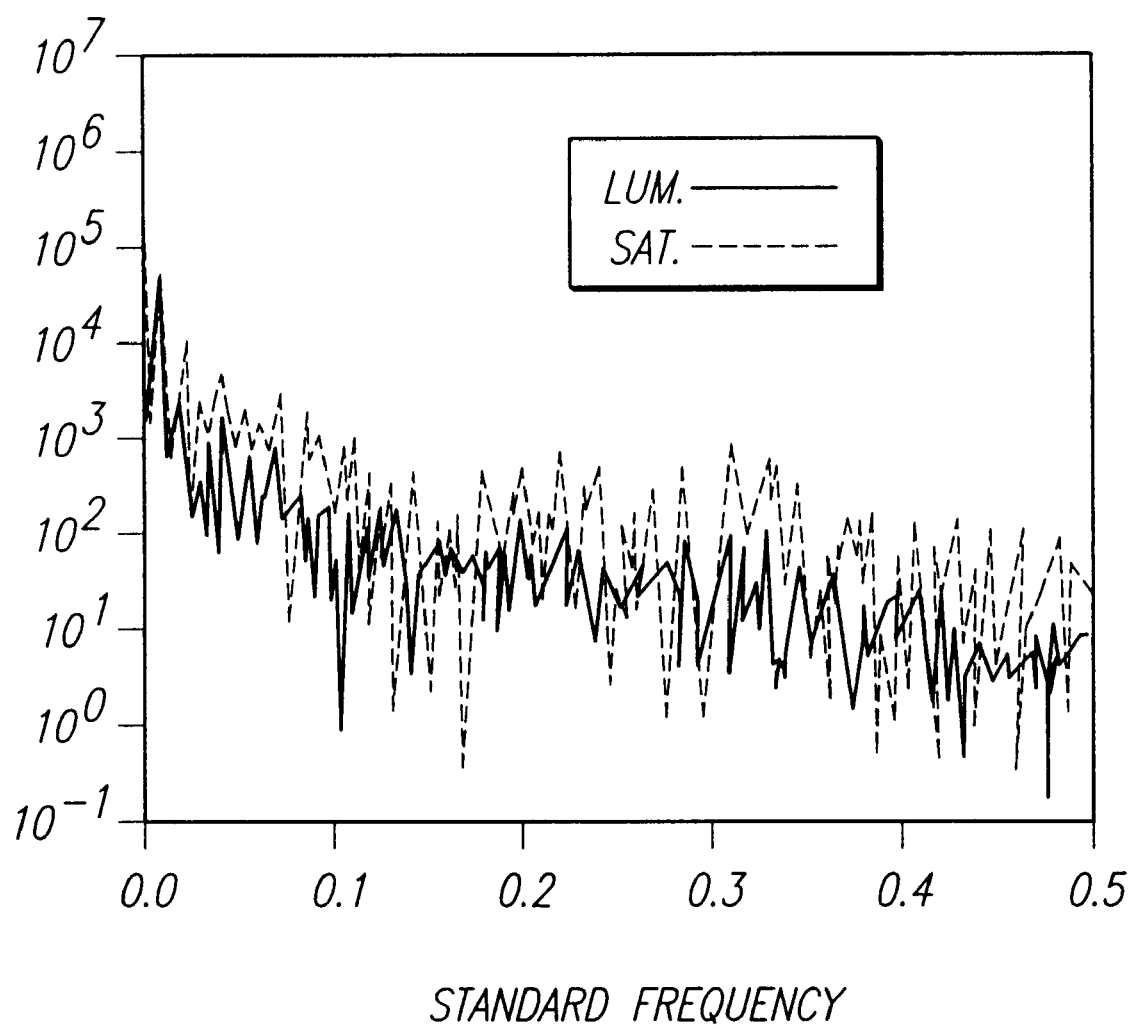
FIG. 12 is a waveform diagram of power spectra of the luminance and saturation according to a conventional device.
Figure 15:
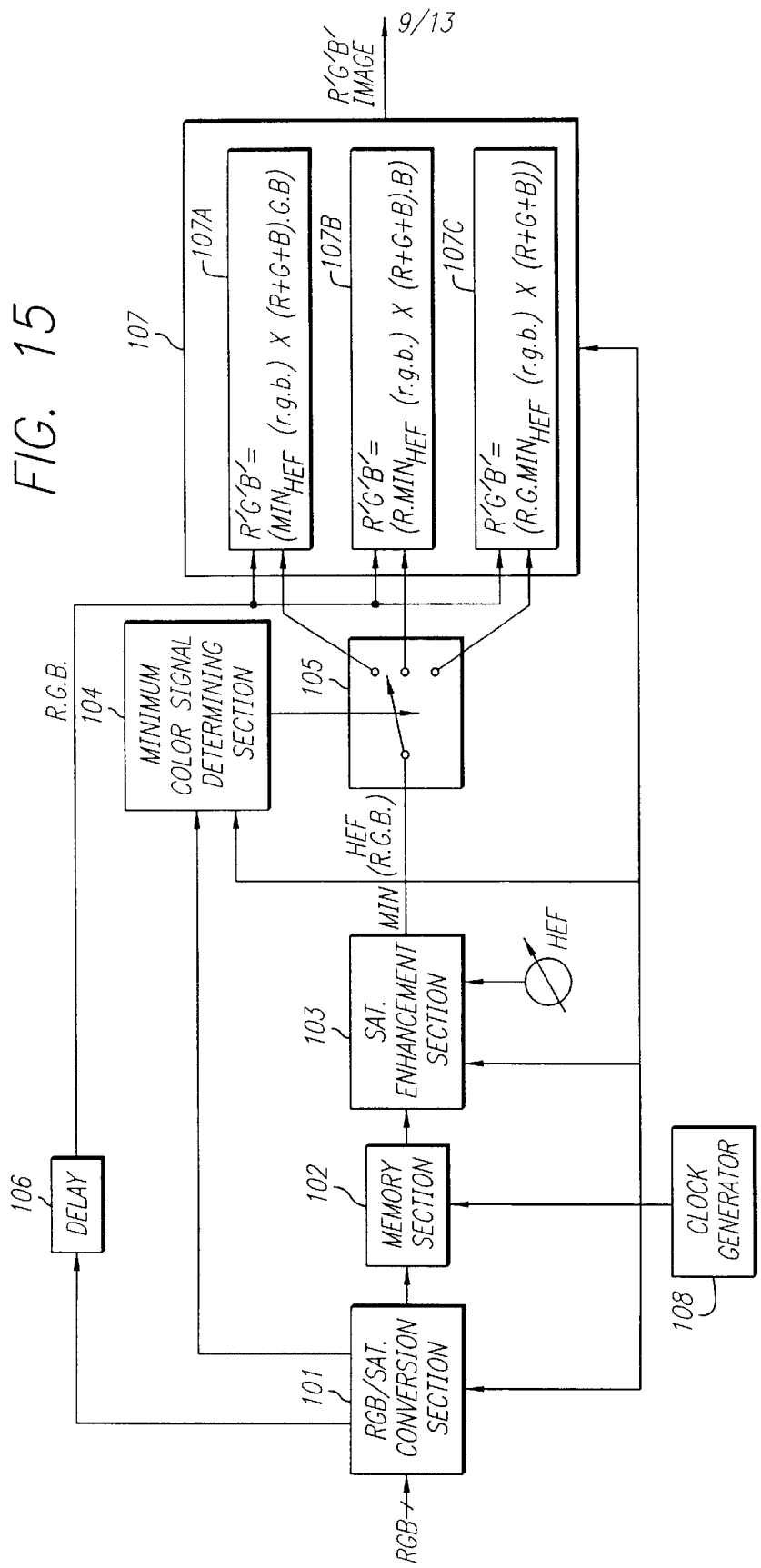
FIG. 15 is a block diagram of the color image enhancement device for a video display appliance according to a first embodiment of the present invention.

FIG. 15 is a block diagram of the color image enhancement device using the saturation component according to a first embodiment of the present invention.

Referring to FIG. 15, the color image enhancement device includes a RGB/saturation conversion section 101 for normalizing an input image of an RGB color model, obtaining a saturation therefrom, and producing a negative image of the saturation, a memory 102 for storing the negative image of the saturation provided from the RGB/saturation conversion section 101, a saturation enhancement section 103 for filtering the negative image of the saturation provided from the memory with its high frequency emphasis to enhance the saturation. The color image enhancement device also includes a minimum primary color determining section 104 for determining which primary color component among normalized rgb primary color components has the minimum value, according to the minimum primary color component min(r,g,b) used in the RGB/saturation conversion section 101, and producing a corresponding switching control signal, a switching section 105 for outputting the minimum enhanced primary color component $\min_{hef}(r,g,b)$ outputted from the saturation enhancement section 103 to one of three different paths in accordance with the switching control signal provided from the minimum primary color determining section 104, a saturation/RGB conversion section 107 for multiplying the sum of the original RGB color components by the output $\min_{hef}(r,g,b)$ of the switching section 105 and outputting the multiplied primary color component along with other enhanced primary color components without multiplication, and a delay 106 for delaying for a predetermined time the RGB color components provided from the RGB/saturation conversion section 101 and outputting the delayed RGB color components to the saturation/RGB conversion section 107. The clock generator 108 generates and provides a clock signal to the required sections.

The operation of the color image enhancement device according to the present invention as constructed above will be explained in detail with reference to FIGS. 15 to 17.

The RGB/saturation conversion section 101 normalizes the input image of the RGB components (R,G,B), obtains the saturation by the equation 1.17, and then produces the negative image S'(x,y) of the saturation obtained by the equation 2.1. The memory section 102 stores therein the negative image S'(x,y) outputted from the RGB/saturation conversion section 101.

The saturation enhancement section 103 receives the negative image S'(x,y) of the saturation outputted from the memory 102, and performs a high-frequency-emphasized filtering with respect to the negative image in accordance with the following equation 3.1 to enhance the saturation.

$$S'_{hef}(x,y) = S'(x,y) * \text{hef} \qquad (\text{equation 3.1})$$

Specifically, a high-frequency-emphasized filtering or high-boost filtering is performed with respect to the negative saturation image S'(x,y) by a high-frequency-emphasis filter with a 2-dimensional convolution in accordance with the equation 2.9. Here, the high-pass filtering can be expressed by the following equation:

$$\text{High-pass} = \text{Original} - \text{Low-pass} \qquad (\text{equation 3.2})$$

Specifically, the high-pass filtered image can be obtained by subtracting the low-pass filtered image from the original image. The computing process for the high-frequency-emphasized filtering can be expressed by the following equation:

$$\begin{aligned}\text{High-boost} &= (A)\text{Origincal} - \text{Low-pass} \\ &= (A-1)\text{Original} + \text{Original} - \text{Low-pass} \\ &= (A-1)\text{Original} + \text{High-pass}\end{aligned} \qquad (\text{equation 3.3})$$

In the equation 3.3, if A=1, a standard high-pass filtering is performed, while if A>1, a high-frequency-emphasis filtering is performed. One standard high-pass filter can be expressed by the following equation:

$$\frac{1}{9}\begin{bmatrix} -1 & -1 & -1 \\ -1 & 9A-1 & -1 \\ -1 & -1 & -1 \end{bmatrix} \qquad (\text{equation 3.4})$$

Accordingly, if "A" of the filter mask is greater than "1", the filter can be a high-frequency-emphasis filter.

In this embodiment, the equation 2.9 has the same computing function as the equation 3.4. The high frequency component of the saturation, i.e., the negative image of the saturation high-frequency-emphasized by the filter, which is not contained in the luminance, is converted into the positive image of the original saturation through the saturation/RGB conversion section 107 in accordance with the following equation:

$$S_{hef}(x,y) = 1 - \left[\frac{S'_{hef}(x,y)}{255}\right] \qquad (\text{equation 3.5})$$

In other words, in order to obtain the normalized r,g,b colors of the RGB color model with respect to the high-frequency-emphasized saturation $S_{hef}(x,y)$ which is obtained using the equation 3.5, the saturation enhancement section 103 detects the minimum value $\min_{hef}(r,g,b)$ among the r,g,b colors using the following equation 3.6 which is an inverse of the equation 1.17, and provides the detected minimum value to the input terminal of the switching section 105:

$$\min_{hef}(r,g,b) = \frac{1 - S_{hef}(x,y)}{3} \qquad (\text{equation 3.6})$$

Meanwhile, the minimum primary color determining section 104 for determining the minimum primary color of the pixel detects what primary color has the minimum value among the r,g,b primary colors, based on min(r,g,b), so as to control the switching operation of the switching section 105 accordingly. Thus, the minimum value $\min_{hef}(r,g,b)$ among the r,g,b colors outputted from the saturation enhancement section 103 is provided to one of saturation/RGB converters 107A to 107C in the saturation/RGB conversion section 107.

For instance, if it is determined that r is the minimum primary color signal by the minimum primary color determining section 104, $\min_{hef}(r,g,b)$ is inputted to the first saturation/RGB converter 107A. If it is detected that g or b is the minimum primary color signal, $\min_{hef}(r,g,b)$ is inputted to the second or third saturation/RGB converters 107B and 107C, respectively.

The saturation/RGB conversion section 107 utilizes the following equations in accordance with min(r,g,b) used in the equation 1.17.

if min(r,g,b)=r, $$(R',G',B')=(\min_{hef}(r,g,b)\times(R+G+B),G,B) \quad \text{(equation 3.7)}$$

if min(r,g,b)=g, $$(R',G',B')=(R, \min_{hef}(r,g,b)\times(R+G+B),B) \quad \text{(equation 3.8)}$$

if min(r,g,b)=b, $$(R'G',R')=(R,G, \min_{hef}(r,g,b)\times(R+G+B)) \quad \text{(equation 3.9)}$$

At this time, if the minimum primary color signal min(r,g,b) of the original RGB color image is r as in the equation 3.7, the value R' among the enhanced R',G',B' color image components is produced by multiplying the sum of the original RGB color components by the enhanced saturation component $\min_{hef}(r,g,b)$, while other enhanced G',B' color component values are replaced by the original G,B color component values, respectively. The equations 3.8 and 3.9 are also be applied in the same manner as the equation 3.7.

Specifically, according to the equations 3.7, 3.8, 3.9 for converting the saturation into the RGB model, if a certain image region has no variation, the saturation is converted into the original RGB model with the original colors unchanged though the saturation has been under the high-frequency emphasis filtering. The high-frequency-emphasis filter has a 3×3 convolution mask, and thus no variation in the high-frequency-emphasis filtering of the saturation means that the colors are not changed in a region smaller than a 3×3 pixel region.

The difference between the conventional image enhancement device of FIG. 13 utilizing the luminance component and the image enhancement device utilizing the saturation according to the present invention will now be explained.

Figure 16A:
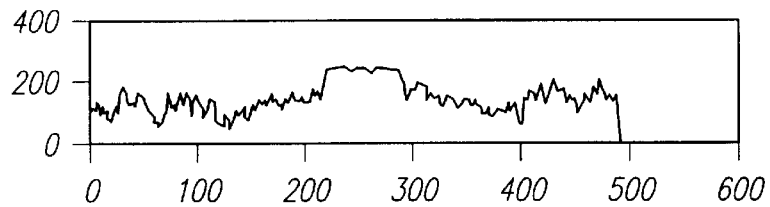
FIGS. 16A–16C are waveform diagrams diagram illustrating RGB values of 340-th line of the baboon image displayed according to the present invention.
Figure 16B:
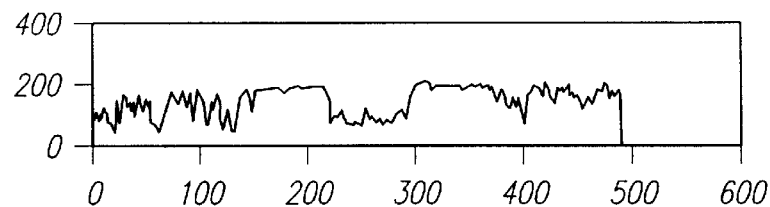
Figure 16C:
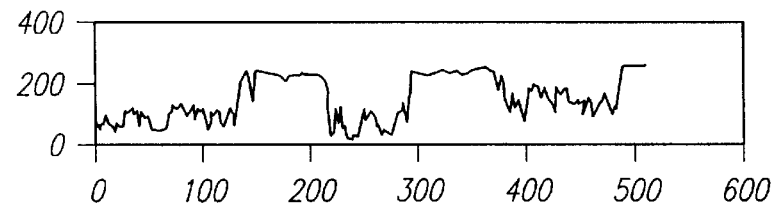

FIGS. 16A–16C show the R,G,B values of the 340-th line of a displayed baboon image. FIGS. 17A–17C show the R,G,B values of the same image which has been enhanced only utilizing the luminance component with a mask value of 0.2 in the equation 2.9. FIGS. 17D–17F show the R,G,B values of the same image which has been enhanced by the saturation process with a mask value of 0.5 in the equation 2.9 in accordance with the present invention.

The R,G,B values in FIGS. 17A–17C show the same variation rate in comparison with the R,G,B values of the original image of FIGS. 16A–16C. In FIGS. 17D–17F, however, only the smallest value among the R,G,B value shows a variation because only the saturation enhancement process has been performed with respect to the image. The variation of the R,G,B values does not affect the primary colors and pure colors in which two primary colors are mixed, such as white, black, yellow, cyan, green, magenta, red, blue, etc., but affects other colors in which all three RGB primary colors are mixed.

The saturation enhancement process is performed in such a manner that the R,G,B values are normalized, the smallest value obtained among the R,G,B values is multiplied by 3, the resultant value from the multiplication is subtracted from "1", the resultant value from the subtraction is high-frequency-emphasized, and then processed in accordance with the equations 3.7, 3.8, 3.9. According to the above process, since only the smallest value among the R,G,B values is varied, a high-frequency component, which is not contained in the luminance but is contained in the saturation, is emphasized resulting in that the sharpness of the image is improved and the colors of the image is emphasized.

Figure 18:
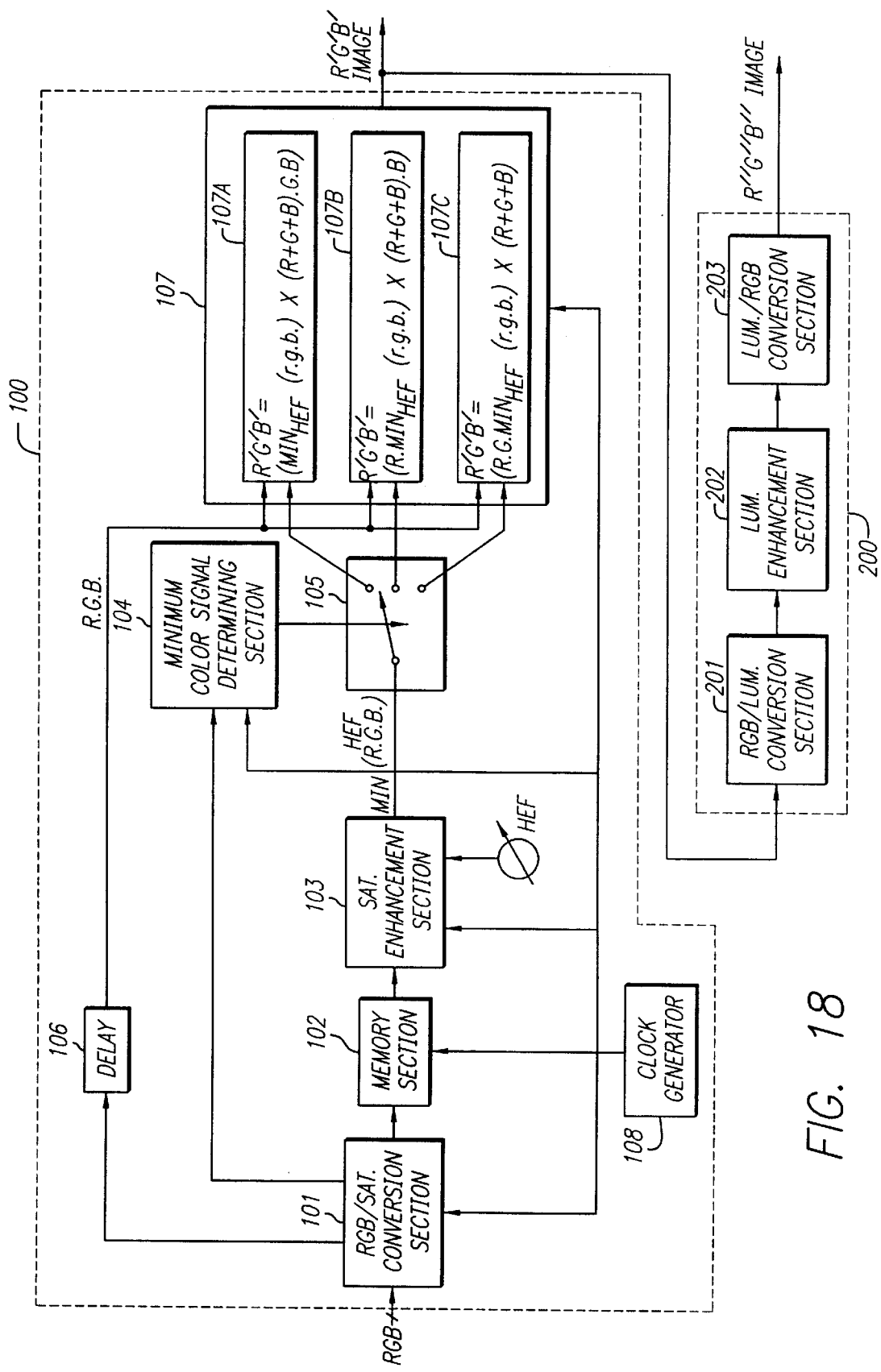
FIG. 18 is a block diagram of the color image enhancement device for a video display appliance according to a second embodiment of the present invention.

FIG. 18 is a block diagram of the color image enhancement device according to a second embodiment of the present invention. Referring to FIG. 18, the color image enhancement device is provided with an RGB/saturation conversion section 101 for normalizing an input image of an RGB color model, obtaining a saturation therefrom, and producing a negative image of the saturation, a memory 102 for storing the negative image of the saturation provided from the RGB/saturation conversion section 101, a saturation enhancement section 103 for filtering the negative image of the saturation provided from the memory with high frequency emphasis to enhance the saturation.

The color image enhancement device is also provided with a minimum primary color determining section 104 for determining which primary color component among normalized r,g,b primary color components has the minimum value, according to the minimum primary color component min(r,g,b) used in the RGB/saturation conversion section 101, and producing a corresponding switching control signal, a switching section 105 for outputting the minimum enhanced primary color component $\min_{hef}(r,g,b)$ outputted from the saturation enhancement section 103 to one of three different paths in accordance with the switching control signal provided from the minimum primary color determining section 104, a saturation/RGB conversion section 107 for multiplying the sum of the original RGB color components by the output $\min_{hef}(r,g,b)$ of the switching section 105 and outputting the multiplied primary color component along with other enhanced primary color components without multiplication, and a delay 106 for delaying for a predetermined time the RGB color components provided from the RGB/saturation conversion section 101 and outputting the delayed RGB color components to the saturation/RGB conversion section 107.

The color image enhancement device is also provided with an RGB/luminance conversion section 201 for converting the image of $R^+,G^+,B^+$ outputted from the saturation/RGB conversion section 107 into a luminance Y, a luminance enhancement section 202 for enhancing the luminance by supplying a high-frequency-emphasis filter coefficient to the luminance component outputted from the RGB/luminance conversion section 201, and a luminance/RGB conversion section 203 for multiplying the original image of R(x,y), G(x,y), B(x,y) by the luminance component enhanced by the luminance enhancement section 202 to provide a luminance-enhanced image of R",G",B". The clock generator 108 generates and provides a clock signal to the required sections.

The operation of the color image enhancement device according to the second embodiment of the present invention as constructed above will be explained.

In this embodiment, the saturation is first processed, and then the luminance component is processed utilizing the respective advantages of the saturation component and the luminance component. That is, the device performs a complementary process of the saturation and the luminance, so that the sharpness of image on fine portions, which are not included in the luminance of the saturation component, is improved with the color emphasized, and the unnatural color caused by excessive processing of the saturation only is prevented from being produced.

Specifically, the sharpness of the image is greatly improved by the saturation processing part 100 of FIG. 18 utilizing the saturation component, and then by the luminance processing part 200 of FIG. 18 utilizing the luminance component. At this time, all the equations used in the first embodiment are also used. That is, the equations 3.1 to 3.9 are used in processing the saturation component, and the equations 2.8 to 2.11 described in the prior art are used in processing the luminance component.

In successively processing the saturation component and the luminance component according to the second embodiment of the present invention, the $\alpha$ values of the high-frequency-emphasis filters are determined as "0.5" and "0.1" in processing the saturation component and the luminance component, respectively, resulting in the increase of the image sharpness and the emphasis of the image color in comparison with the original image. Also, according to the results of several experiments in accordance with the second embodiment, it is preferable that the $\alpha$ value of the high-frequency-emphasis filter of the saturation be greater than that of high-frequency-emphasis filter of the luminance. Also, the $\alpha$ value of the high-frequency-emphasis filter may be slightly varied in conformity with the color images to be processed. In the second embodiment, it is most suitable that the $\alpha$ value of the high-frequency-emphasis filter of the saturation be in the range of $0.4 \leq \alpha \leq 0.6$, and that the high-frequency-emphasis filter of the luminance be in the range of $0.05 \leq \alpha \leq 0.15$.

In processing the saturation component according to the present invention, proper processing of the saturation provides an emphasized color of image to give a live or animated feel on a display screen since the saturation presents the purity of the color. However, in the event that the image color is excessively emphasized, an unnatural image will be produced.

Figure 19:
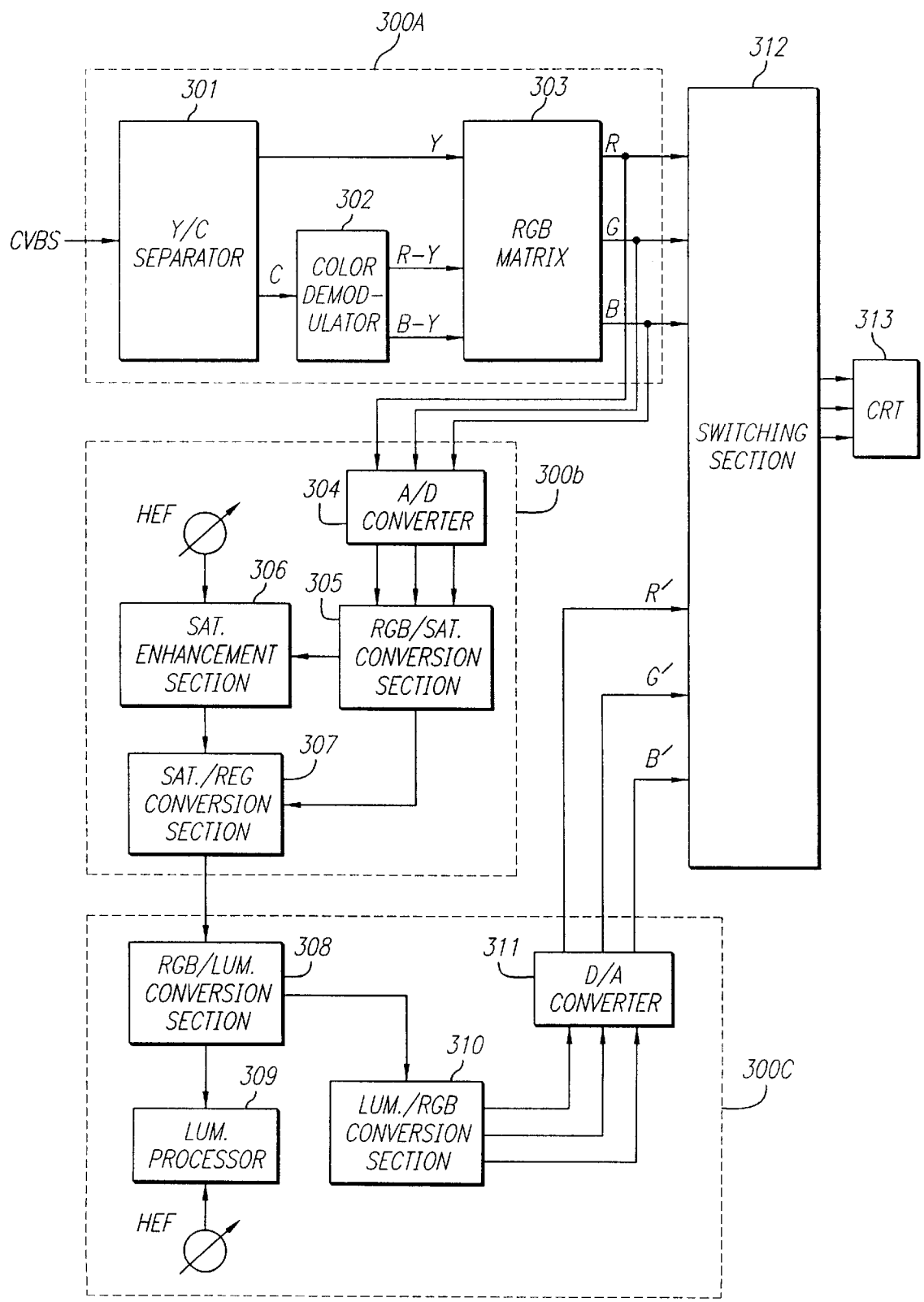
FIG. 19 is a block diagram of a television to which the color image enhancement device according to the present invention is applied.

FIG. 19 is a block diagram of a television circuit to which the color image enhancement device according to the present invention is applied. Referring to FIG. 19, a composite video signal CVBS is separated into a luminance signal Y and a chrominance signal C by the luminance/chrominance (Y/C) separator 301. The separated luminance signal Y is directly supplied to an RGB matrix 303, while the chrominance signal C is converted into color difference signals R-Y, B-Y by a color demodulator section 302, and the color difference signals are supplied to the RGB matrix 303. The RGB matrix 303 converts the luminance signal Y and the color difference signals R-Y, B-Y inputted thereto into an image signal of R,G,B colors and provides the RGB image signal to an input selection switch 312.

The image signal of R,G,B provided from the RGB matrix 303 is converted into a digital signal by an A/D converter 304, and the digital image signal is supplied to an RGB/saturation conversion section 305. The RGB/saturation conversion section 305 normalizes the image signal of the RGB color model in accordance with the equation 1.9, obtains the saturations by the equation 1.17, and produces a negative image S'(x,y) of sat saturation according to the equation 2.1.

The saturation enhancement section 306 filters the negative image s' (x,y) of the saturation with high frequency emphasis according to the equation 3.1 to enhance the saturation. The output of the saturation enhancement section 306 is then converted into a positive image of the original saturation by the saturation/RGB conversion section 307.

The positive image of the original saturation is converted into the luminance signal Y, and the converted luminance signal Y is processed by the luminance processor 309 in accordance with the equation 2.8 to 2.11, and then converted into color signals of R,G,B by the luminance/RGB conversion section 310. The color signals of R,G,B are converted into analog signals by the D/A converter 311, and supplied to the switching section 312.

The switching section 312 selects either the color signals of R,G,B outputted from the RGB matrix 303 or the color signals of R',G',B' which have been saturation-processed and luminance-processed through saturation processing block 300B and luminance processing block 300C, and provide the selected color signals to a cathode ray tube (CRT) 313.

A user can adjust the $\alpha$ value of the high-frequency-emphasis filter convoluted by the saturation component and the luminance component when viewing the image displayed on the CRT 313, and thus enjoy a picture quality of his/her taste.

As described above, according to the present invention, a color image of an RGB color model is converted into a color image of an LHS color model, and the enhancement of the saturation component which is an intrinsic color characteristic of the image is processed in such a manner that the three primary colors or the pure colors in which the two primary colors are mixed, such as white, black, yellow, cyan, green, magenta, red, blue, etc. are not affected by the process, but other colors in which all three primary colors are mixed is affected by the process, thereby improving the sharpness of the image. Further, since the luminance enhancement process is performed, following the saturation enhancement process, the color emphasis can be achieved in addition to the improved sharpness of the image.

While the present invention has been described and illustrated herein with reference to the preferred embodiment thereof, it will be understood by those skilled in the art that various changes in form and details may be made therein without departing from the spirit and scope of the invention.

What is claimed is:

1. A color image enhancement device comprising:
    an RGB (red, green, blue)/saturation conversion section for obtaining a saturation of an image of an RGB color model;
    a saturation enhancement section for emphasizing a high frequency band of the saturation outputted from the RGB/saturation conversion section to enhance the saturation;
    a minimum primary color determining section for determining which primary color signal among normalized RGB primary color signals outputted from the saturation enhancement section has a minimum value, based on a minimum primary color signal used in the RGB/saturation conversion section, and providing a corresponding switching control signal;
    a switch for switching an output of the saturation enhancement section through one of three paths in accordance with the switching control signal provided from the minimum primary color determining section; and
    a saturation/RGB conversion section for converting an output of the saturation enhancement section inputted through the switch into enhanced color signals.

2. A color image enhancement device as claimed in claim 1, further comprising:
    an RGB/luminance conversion section for converting the enhanced color signals outputted from the saturation/RGB conversion section into a luminance signal;
    a luminance enhancement section for enhancing the luminance signal by supplying a high-frequency-emphasis filter coefficient to the luminance signal outputted from the RGB/luminance conversion section; and a luminance/RGB conversion section for multiplying the original RGB color signals by the luminance signal enhanced by the luminance enhancement section to provide luminance-enhanced color signals.

3. A method of enhancing color images comprising the steps of:

receiving RGB (red, green, blue) signals containing images;

generating a saturation of the image of the RGB signals from the received RGB signals after normalizing the RGB signals;

performing on the saturation a high frequency emphasized filtering to enhance the saturation;

determining a minimum primary color signal among saturation-enhanced primary color signals;

generating a switching control signal according to the determined minimum primary color signal;

switching the saturation-enhanced color signals through one of three paths according to the switching control signal; and converting the saturation-enhanced color signals having passed through one of the three paths to RGB signals by multiplying the minimum primary color signal by the saturation-enhanced color signals.

* * * * *